United States Patent
Mullenix et al.

(10) Patent No.: US 11,226,211 B2
(45) Date of Patent: Jan. 18, 2022

(54) INDUCTIVE POSITION DETECTION

(71) Applicant: Texas Instruments Incorporated, Dallas, TX (US)

(72) Inventors: Joyce Mullenix, San Jose, CA (US); George Reitsma, Redwood City, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 517 days.

(21) Appl. No.: 14/801,810

(22) Filed: Jul. 16, 2015

(65) Prior Publication Data

US 2016/0069662 A1 Mar. 10, 2016

Related U.S. Application Data

(60) Provisional application No. 62/047,227, filed on Sep. 8, 2014.

(51) Int. Cl.
*G01D 5/22* (2006.01)
*G06F 3/00* (2006.01)
*G01D 5/20* (2006.01)

(52) U.S. Cl.
CPC .............. *G01D 5/22* (2013.01); *G01D 5/202* (2013.01); *G01D 5/2225* (2013.01); *G06F 3/00* (2013.01)

(58) Field of Classification Search
CPC ........ G01D 5/22; G01D 5/202; G01D 5/2225; G01D 5/145; G01D 5/20; G01D 5/204; G01D 5/2208; G06F 3/00; G01B 7/14
USPC .................................................. 324/207.15
See application file for complete search history.

(56) References Cited

U.S. PATENT DOCUMENTS

| | | | |
|---|---|---|---|
| 5,729,129 A | 3/1998 | Acker | |
| 6,204,659 B1* | 3/2001 | Yamamoto | G01B 7/026 324/207.16 |
| 2001/0052771 A1* | 12/2001 | Jagiella | G01B 7/003 324/207.16 |
| 2008/0148803 A1 | 6/2008 | Skultety-Betz et al. | |
| 2009/0189600 A1* | 7/2009 | Kurkovskiy | H03K 17/9505 324/207.16 |
| 2013/0154621 A1 | 6/2013 | Moenkemoeller | |

(Continued)

FOREIGN PATENT DOCUMENTS

CN 1186549 A 7/1998
CN 1954240 A 4/2007
(Continued)

OTHER PUBLICATIONS

China National Intellectual Property Administration, "First Office Action", issued in connection with application No. 201510563122.6 dated Nov. 27, 2018, 20 pages. (Chinese language version and English translation attached).

(Continued)

*Primary Examiner* — Christopher P McAndrew
(74) *Attorney, Agent, or Firm* — Ray A. King; Charles A. Brill; Frank D. Cimino

(57) ABSTRACT

A position detecting system detects and responds to the movement of a target through a sensing domain area of a plane. The movement causes the amount of the target that lies within a first sensing domain area of a first sensor to change. A second sensor detects a height from the plane to a sensor for enhancing accuracy of measurements from the first sensor.

9 Claims, 7 Drawing Sheets

(56) References Cited

U.S. PATENT DOCUMENTS

| | | | |
|---|---|---|---|
| 2014/0239942 A1 | 8/2014 | Schaaf | |
| 2014/0247040 A1 | 9/2014 | Reitsma et al. | |
| 2015/0268028 A1* | 9/2015 | Hirota | G01B 7/02 324/207.17 |
| 2015/0308810 A1* | 10/2015 | Gilmore | G01D 5/2053 324/207.13 |

FOREIGN PATENT DOCUMENTS

| | | |
|---|---|---|
| CN | 103162611 A | 6/2013 |
| CN | 103988052 A | 8/2014 |
| CN | 105004356 A | 10/2015 |

OTHER PUBLICATIONS

Chinese Office Action for CN 201510563122.6 dated Aug. 16, 2019.

* cited by examiner

INDUCTIVE POSITION DETECTION

CLAIM OF PRIORITY

This application for patent claims priority to U.S. Provisional Application No. 62/047,227 entitled "METHOD AND APPARATUS FOR DETECTION OF POSITION IN A 2D PLANE WITH REDUCED SENSITIVITY TO MECHANICAL TOLERANCES" filed Sep. 8, 2014 in the United States Patent and Trademark Office, wherein the application listed above is hereby fully incorporated by reference herein for all purposes.

BACKGROUND

Computer systems include processors that are operable to retrieve and process signals from sensors such a proximity detectors. Such sensors generate signals in response to the proximity of a conductive object to one or more such sensors. For example, movement of a conductive object through the magnetic field generated by a coil causes variations in the magnetic field that are detected by the sensors. However, the variations in the magnetic field do not well-localize movement of the conductive object through the magnetic field when such movement occurs across each of the dimensions in three-dimensional space.

SUMMARY

The problems noted above can be addressed in a position detecting system for detecting and responding to the movement of a target through a sensing domain area of a plane. The movement causes the amount of the target that lies within a first sensing domain area of a first sensor to change. A second sensor detects a height from the plane to a sensor for enhancing accuracy of measurements from the first sensor.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "mode" can mean a particular architecture, configuration, arrangement, application, and the like, for accomplishing a purpose.

Figure 1:
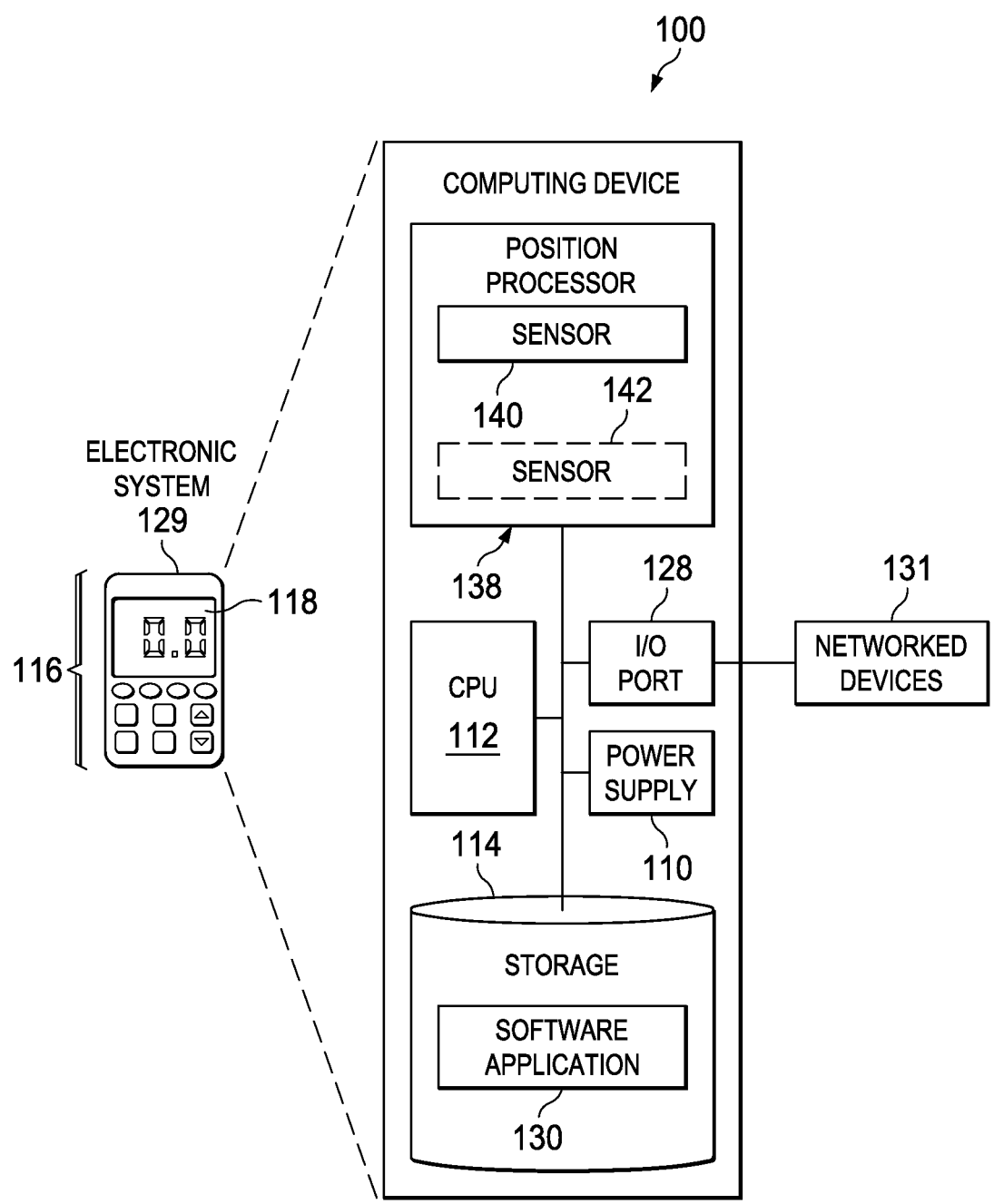
FIG. 1 shows an illustrative electronic device in accordance with example embodiments of the disclosure.

FIG. 1 shows an illustrative computing system 100 in accordance with certain embodiments of the disclosure. For example, the computing system 100 is, or is incorporated into, an electronic system 129, such as a computer, electronics control "box" or display, communications equipment (including transmitters), or any other type of electronic system arranged to generate radio-frequency signals.

In some embodiments, the computing system 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing system 100.

The CPU 112 comprises memory and logic that store information frequently accessed from the storage 114. The computing system 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 is coupled to I/O (Input-Output) port 128, which provides an interface that is configured to receive input from (and/or provide output to) networked devices 131. The networked devices 131 can include any device capable of point-to-point and/or networked communications with the computing system 100. The computing system 100 can also be coupled to peripherals and/or computing devices, including tangible, non-transitory media (such as flash memory) and/or cabled or wireless media. These and other input and output devices are selectively coupled to the computing system 100 by external devices using wireless or cabled connections. The storage 114 can be accessed by, for example, by the networked devices 131.

The CPU 112 is coupled to I/O (Input-Output) port 128, which provides an interface that is configured to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing system 100 by external devices using or cabled connections. The CPU 112, storage 114, and power supply 110 can be coupled to an external power supply (not shown) or coupled to a local power source (such as a battery, solar cell, alternator, inductive field, fuel cell, capacitor, and the like).

The computing system 100 includes a position processor 138. The position processor 138 is a processor (such as CPU 112 and/or control circuitry) suitable for processing sensor quantities generated in response to movement. For example, a user can manipulate a control device that includes one or more sensors 140 for generating a signal for conveying the sensor quantities. The position processor 138 is operable to determine a position (e.g., height) of a target object relative to a sensor 140 and optionally to other sensors such as sensor 142.

Sensors 140 and 142 are typically inductive sensors (such as coils) that generate an electromagnetic field that is disturbed, for example, by the movement of a conductive object through the generated (electromagnetic) field(s). One or more of the sensors detect the one or more field disturbances, where each such sensor (e.g., each of sensors 140 and 142) generates a signal for conveying the sensor quantities. The sensor quantities, for example, convey substantially continuous information (e.g., over a period of interest) with respect to the location of the conductive object as disclosed herein.

The sensors (such as those operable to inductively sense eddy currents in the target) responds not only to a change in the lateral position (x-y plane) of the target, but also to a change in z-direction ("vertical" relative to the orientation of the x-y plane) distance between coil and target. The changes in height are often caused by mechanical tolerance variations, substrate vibration/flexing, thermal expansion/contraction, and the like. The disclosed method and apparatus, for example, substantially mitigates errors resulting from sensor variations in height, such that a more robust and accurate position sensing setup is obtained.

Position processor 138 is operable to receive a coil characteristic from sensor 140, and to determine the position of a target (e.g., control) object with respect to the position of the sensor 140 in response to the coil characteristic. A change in the coil characteristic is substantially detectable by position processor 138 in accordance with two criteria: 1) The change in characteristic is significant with respect to the noise in the system (which includes noise from coil 210, noise received by coil 210 from the environment, and noise from position processor 138); and 2) The change in characteristic is significant with respect to the resolution of the system (e.g., a change in the coil characteristic that corresponds to a change in positioning of the target that has a meaningful impact—such as an increase in safety—to the user and/or system).

The sensor quantities can be used, for example, to convey information from a control interface that encodes rotational (e.g., concerning movement about an axis) and/or translational (e.g., concerning movement along a line) movement by a user. For example, rotational and/or translational sensor quantities can be used in applications that require higher degrees of accuracy and safety. Such applications include automotive "drive by wire" mechanisms, which incorporate control devices such as the steering wheel, the brake pedal, the gas pedal, dashboard/panel knobs and switches, and the like. Accordingly, the sensors 140 and/or 142 are relatively resistant against wear, electrical discontinuities (such as "potentiometer-noise" that occurs during control shaft rotation), variations in mechanical tolerances (e.g., due to temperature fluctuations), variations in resistance (e.g., due to moisture build-up and fungus growth), and the like.

Figure 2:
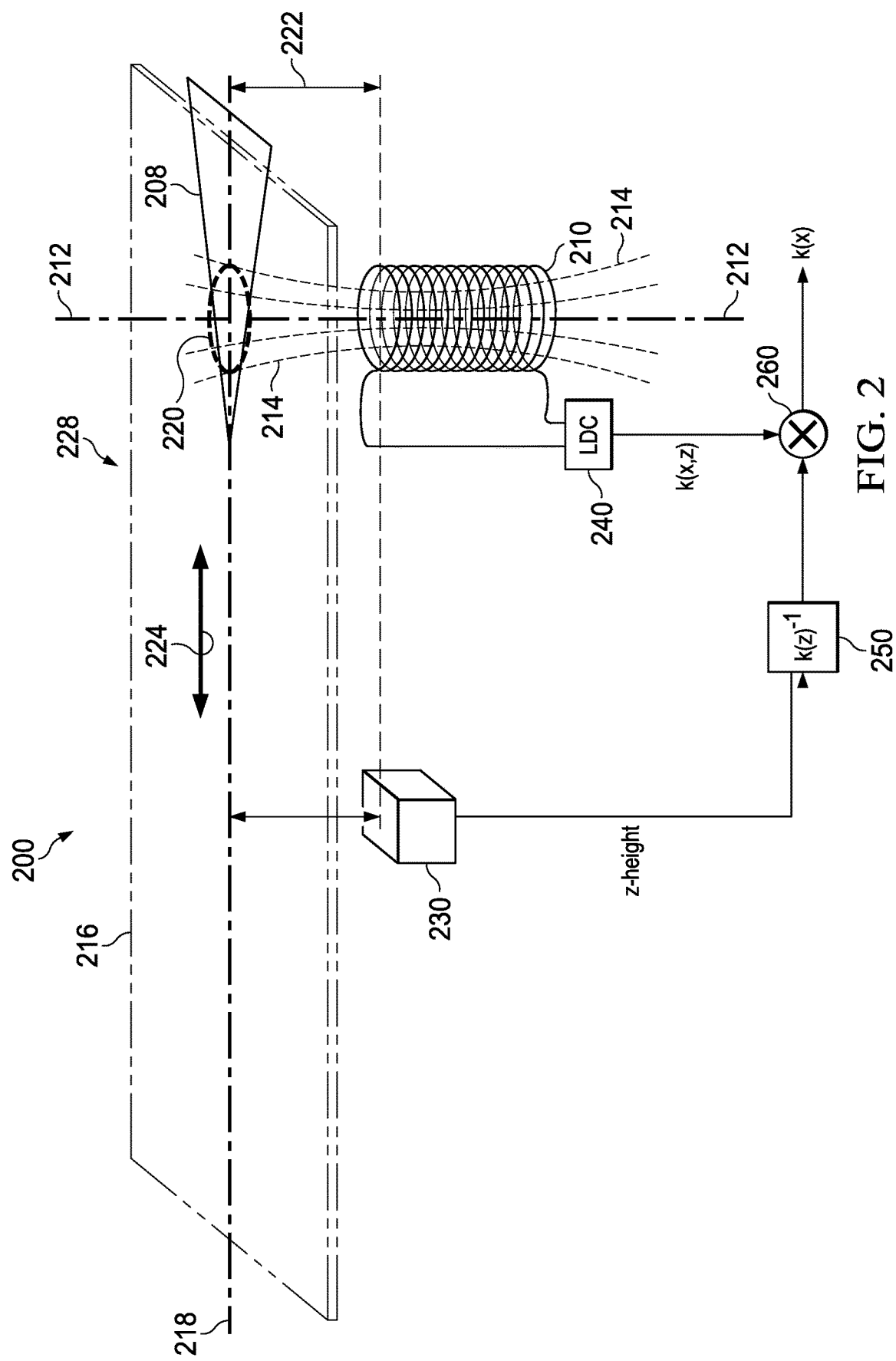
FIG. 2 is a schematic diagram of a linear inductive position detector in accordance with embodiments of the disclosure.

FIG. 2 is a schematic diagram of a linear inductive position detector in accordance with embodiments of the disclosure. Generally described, an inductive position detector 200 is communicatively coupled to the position processor 138 and is operable to detect a (e.g., changing) position of a conductive object (e.g., target 208), which linearly moves across (e.g., or along) an adjacent two-dimensional plane 228 (e.g., where the plane is defined relative to a surface of an adjacent substrate 216). (FIG. 3, discussed below, illustrates an angular inductive position sensor.)

The position processor 138 can be implemented as an integrated circuit that is physically spaced apart from inductive position detector 200. For example, the inductive position detector 200 can be located adjacent to a disc brake assembly in an automobile (where relatively high temperatures can be present), while the position processor 138 can be located away from the disc brake assembly (where substantially lower temperatures are typically present).

The inductive position detector includes a "z-height" sensor 230, which generates a signal for maintaining and/or enhancing the accuracy of position measurements. For example, the more robust position measurements allows reduced dependency on mechanical tolerances of various components (such as the relative positions of the substrate 216 and coil 210) of the inductive position detector 200. As discussed below, the z-height sensor 230 measures the relative distance 222 (e.g., "height") of the plane 228 of movement (e.g., in which a target for a sensor moves) to a point associated with the position of the sensor (e.g., coil 210). The relative distance 222 to the plane 228 (or to an object having a relatively fixed distance from the plane 288) can be measured from a point that is offset from the coil 210. Accordingly, the relative distance can be measured in accordance with geometric principles (e.g., triangulation, offsets, and the like).

The inductive position detector 200 includes a sensor. For example, the sensor is coil 210 and is positioned (e.g., mounted) in the inductive position detector 200 such that the coil has a position and orientation that is relatively constant relative to the substrate 216. The coil 210 is oriented having a longitudinal "z-axis" 212, which intersects and is generally perpendicular to a two-dimensional plane 228. The two-dimensional plane 228 can be a substantially planar surface of substrate 216, which could be "flexed" or curved to some degree in various real-world applications.

In operation, vibration, wear and tear, thermal expansion/contraction, and the like, often change the relative positioning of the coil 210 to the substrate 216. As explained below, the z-height sensor 230 measures the relative distance 222 and generates a correction signal for conveying, for example, the change in the relative distance over time. The correction signal is used to maintain and/or enhance the accuracy of coil 210 measurements despite any (e.g., otherwise) significant changes in the relative distance of the coil 210 to target 208.

The coil 210 is operable to generate a time-varying electromagnetic field, which (for example) is generated in response to electrical stimulus applied by the LDC (inductance to digital converter) 240 to the coil 210. The electrical stimulus is operable, for example, to drive (e.g., excite) the sensor coil 210 such that the electromagnetic field varies in accordance with a resonant frequency of a "tank" circuit that includes the coil 210. The generated electromagnetic field includes, for example, a magnetic flux and is illustrated as having field lines 214. The field lines 214 intersect a (e.g., planar or curved) surface of substrate 216 in a sensing domain area 220. The sensing domain area 220 is, for example, a circularly shaped area defined by the intersection of the field lines 214 with the surface of substrate 216.

During excitation, the generated electromagnetic field induces eddy currents within the target 208, where the strongest of the eddy currents are typically located within the sensing domain area 220. The target 208 is arranged to move along an axis 226 (e.g., resulting in linear movement 224), which lies generally parallel to the surface of substrate 216 (note: movement along axis 224 is possible when substrate 216 is flexed such that axis 226 is and/or remains a straight line).

The linear movement 224 changes the amount (e.g., percentage) of the coverage of the target 208 (e.g., the amount of the target that lies within the sensing domain area 220). Accordingly, the target 208 is slideably captivated relative to an assembly including the sensing domain area 220 such that the target 208 variably covers the sensing domain area 220. The eddy currents induced in the target 208 influence the strength of the generated electromagnetic field in accordance with the (e.g., instant) percentage of coverage (e.g., where the percentage of coverage can range from a point as low as 0 percent to a point as high as 100 percent).

The linear movement 224 changes the percentage of the total amount of magnetic flux generated by coil 210 that is received by target 208. Accordingly, the movement also causes changes in the magnitudes of the eddy currents. As the percentage of coverage increases during linear movement, the percentage of the total amount of magnetic flux generated by coil 210 that is received by target 208 is increased (e.g., in accordance with the increased magnitude of the eddy currents). As the percentage of coverage decreases during linear movement, the percentage of the total amount of magnetic flux generated by coil 210 that is received by target 208 (e.g., in accordance with the decrease of the magnitudes of the eddy currents).

The changes of the (e.g., percentage of) magnetic flux received by target 208 (as well as the changes of magnitudes of the eddy currents in the target 208) cause corresponding changes in the nominal (e.g., uninfluenced by the target) electrical characteristics of coil 210. One such coil characteristic is the inductance of coil 210. Another such coil characteristic is the quality (e.g., Q-factor) of coil 210. An indication (e.g., signal) of a selected (e.g., inductance and/or quality) characteristic is sent to the position processor 138, which determines a position (and/or orientation) of the target 208 relative to the coil 210 in response to the changes in one or more indications of the selected characteristic. Accordingly, the coil 210 is operable to generate sensor quantities. The sensor quantities, for example, convey substantially continuous information (e.g., a signal) with respect to the positioning of the conductive object as disclosed herein.

The induced changes to the applied stimulus to the sensor coil 210 are detected by the LDC 240 and processed (e.g., via z-height register 250 and processor 260) in accordance with the z-height signal output by the z-height sensor 230 to determine a relative position of target 208. The relative position can be described in terms of k(x), where k(x) indicates a position in time of the target 208 along the axis 226 of movement. The shape of the target 208 is a "wedge" having a (e.g., uniquely) differing percentage of coverage over movement in one direction along axis 218 such that the location of target 208 along a portion of axis 218 can be identified. As described below, the LDC 240 is optionally operable to measure variations in the applied current by measuring a change in resonance of the coil 210 and/or by measuring a change in voltage (including by measuring the attendant changes in current and/or resistance) of the coil 210.

For solid targets 218, the resistance of target-side eddy current path (e.g., in the target 208) is typically much smaller than the reactive impedance of the sensor-side current path (e.g., in a resonant circuit operable to drive the coil 210 in resonance). Assuming the resistance of the eddy current path is negligible (e.g., substantially smaller than the resistance of the coil 210 and the wires electrically coupled thereto), the following approximation can be made:

$$L = L_\infty (1 - K^2) \quad (1)$$

where L is the actual (e.g., including the inductance presented by the target 208) inductance of the sensor coil 210, $L_\infty$ is the nominal inductance (e.g., without a target) of the sensor coil 210, and K is the coupling factor between the target 208 and the sensor coil 210. Accordingly, a coupling factor K of zero indicates the actual (e.g., measured) inductance is equal to the nominal inductance, and non-zero coupling factors K indicate the actual, resulting inductance is less than the nominal inductance.

As introduced above, the lateral movement (e.g., linear movement 224 and/or k(x)) is detected by measuring the change in the apparent inductance of coil 210 in response to the induced eddy current. For example, the approximation of the coupling factor K is dependent upon the position of the target 208 in each of the three dimensions:

$$K(x,y,z) = K(x,y) * K(z) \quad (2)$$

where x and y are dimensions oriented in accordance with the orientation of the surface 216 and z is the distance (e.g., height) from the (e.g., top) end of coil 210 to the sensing domain area 220 (e.g., as measured by z-height sensor 230). The z-height sensor 230 in one embodiment is a coil, although other sensors such as radar, lidar, sonar, Hall-effect, and like sensors can be used to determine the z dimension.

Empirical measurements of K were made using (e.g., progressively) differing values of x, y, and z and measuring the resulting changes in impedance of coil 210. As disclosed herein, a regression analysis provided indications that the coupling factor for the vertical movement along the z-axis (e.g., z-axis 212) was independent of the lateral movement (e.g., linear movement 224) in a plane 228 substantially orthogonal to the z-axis (e.g. parallel to the sensing domain area 220). As disclosed herein, the z-dependence of the coupling factor K is relatively orthogonal to the x/y-dependence (e.g., lateral motion) of the coupling factor K in cases where, for example, the resistance of the eddy current path in shaped targets is substantially low as compared with the resistance of the coil 210 circuit.

In contrast, conventional position sensing systems (such as resolvers) are dependent on coupled inductors (e.g., where one or more coils are positioned on the target). Conventional position sensing systems use the induced eddy currents of the target to inductively generate a second field that is opposite in polarity to the initially generated magnetic field (e.g., the field that induces the eddy currents), which lessens the strength of the initially generated magnetic field. The conventional position sensing systems use the mutual inductance between coupled inductors a reference plane and a target to determine the a distance between the reference plane and the target.

Although the coupling factor K is dependent upon the position of the target 208 in each of the three dimensions for conventional systems using coupled inductors, (in contrast to the instant disclosure) the z-dependence of the coupling factor K is not orthogonal to the x/y-dependence (e.g., lateral motion) of the coupling factor K:

$$K(x,y,z) \neq K(x,y)*K(z) \qquad (3)$$

for conventional systems using coupled inductors. The conventional systems attempt to lessen the impact of z-axis variation by using coils that are large with respect to distance between the target and the sensor coil. The conventional systems further attempt to lessen the impact of z-axis variation by using many coils in row to order to obtain a piece-wise linear approximation. Such limitations often limit the compactness and cost-efficiencies of the conventional systems.

Accordingly, the disclosed position system (e.g., partially) corrects for the z-dependence of the height measurement signal in accordance with the coupling factor K, where the z-dependence is substantially orthogonal to the x/y-dependence (e.g., lateral motion) of the coupling factor K. The orthogonality of the z-dependency to the x/y-dependencies allows for increased accuracy of measurements, allows for reduced complexity of calculations for determining a position, and allows for closer distances between the coil and target.

The relative strength of the eddy currents generated in the target (from which target position information is (e.g., at least partially) determined) is measured in accordance with the present disclosure by using at least one of several two modes of operation. For example, a first mode is an inductance measurement mode and a second mode is a resonance measurement mode. The modes can be dynamically selected through electronic configuration and/or selected by virtue of particular arrangements of hardware components as designed in a substrate.

The LDC 240 is operable in an inductive measurement mode to measure the apparent inductance of the coil 210. The apparent inductance of the coil 210 is affected by the (target) eddy currents, which weaken the magnetic field and which, in turn, changes the rate that the voltage V decays across coil 210. The change in the decay rates is associated with the apparent inductance of the coil 210. An indication of the measured (e.g., apparent) inductance is scaled (e.g., corrected and/or compensated) using the vertical component of the coupling factor K to determine a position of the target.

The LDC 240 is operable in a resonance measurement mode to measure the inductance of the coil 210 and a "loss factor" (e.g., degree of impedance) of a tank (e.g., resonator) circuit. The tank circuit includes (e.g., at least) the coil 210 coupled in parallel with a capacitor (e.g., included in LDC 240) such that the tank circuit has a resonant frequency that varies in accordance with the inductance, capacitance, and series resistance of the components of the tank circuit. The (e.g., original) resonance of the coil 210 is also affected by changes of the magnitude of the target-side eddy currents. The oscillation frequency (e.g., as affected by the eddy currents) of the tank circuit is measured using a frequency counter. An indication the measured frequency (e.g., resonant frequency) is scaled (e.g., corrected and/or compensated) using the vertical component of the coupling factor K to determine a position of the target.

Accordingly, the position of a target is indirectly determined by measuring the amount of eddy currents produced in the target by a magnetic field generated by a coil acting as a sensor. The produced eddy currents affect one or more characteristics of the coil, which are measured and/or tracked by circuitry coupled to the coil. The shape of the target moving through an area of the generated magnetic field produces a signature such that the amount of movement through (and/or position within) the area of generated magnetic field is associated with a particular positioning (e.g., position and/or degree of rotation) of the target. The accuracy of the determination of the positioning of the target is enhanced by compensating for measured changes in the height between a point relative to the coil and a point relative to the target. The changes in height are compensated for (e.g., scaled) in accordance with the coupling factor K.

Figure 3:
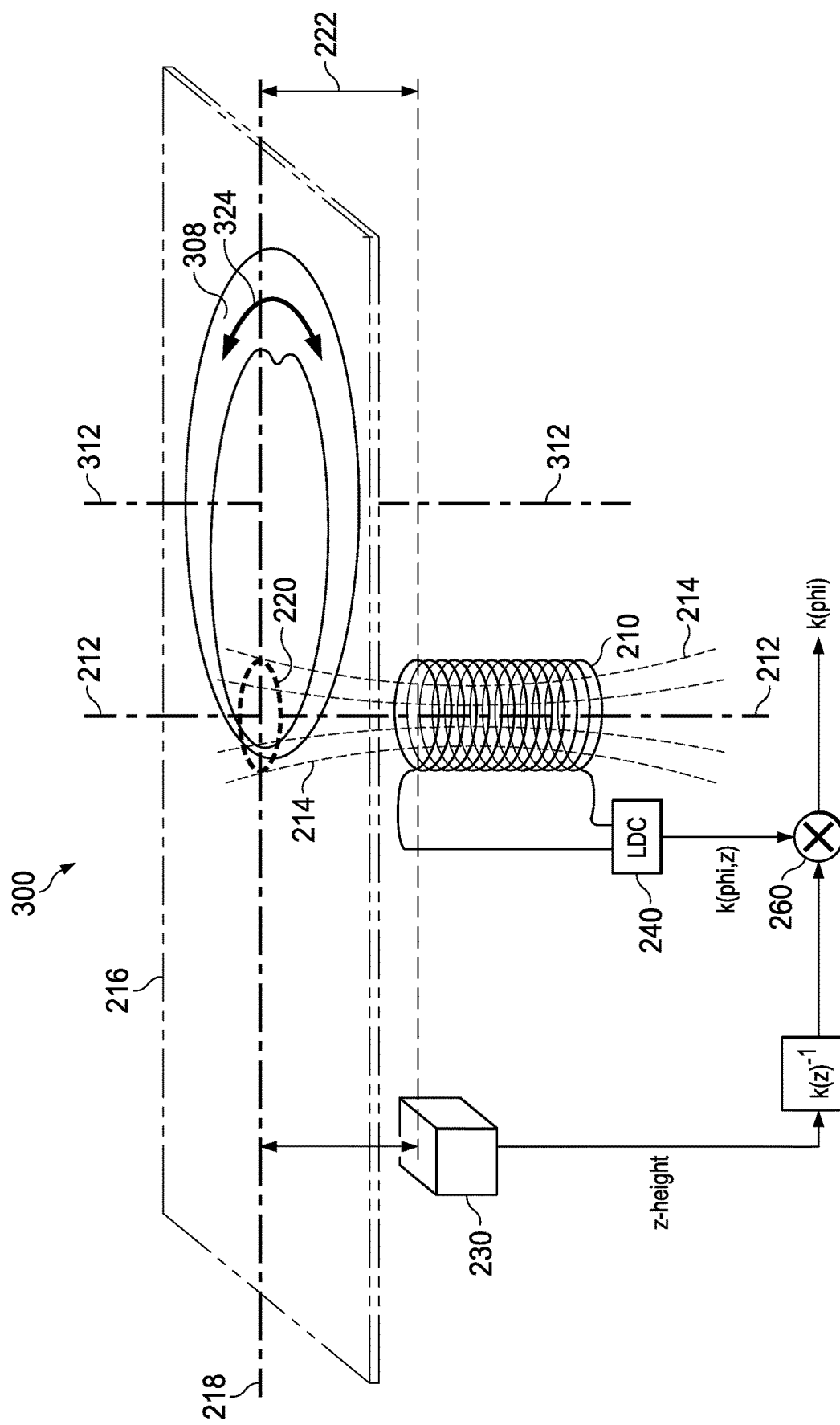
FIG. 3 is a schematic diagram of an angular inductive position detector in accordance with embodiments of the disclosure.

FIG. 3 is a schematic diagram of an angular inductive position detector in accordance with embodiments of the disclosure. Generally described, an inductive position detector 300 is communicatively coupled to the position processor 138 and is operable to detect of position of a conductive object (e.g., target 308), which rotationally moves (e.g., rotates or revolves) in (e.g., or along) a two-dimensional surface 228 (e.g., where the plane is defined relative to a surface of substrate 216). The two-dimensional surface can be, for example, a flat surface or a curved surface (such as a portion of a spherical surface, which permits rotation about an axis 312 perpendicular to a line and/or plane tangent to the spherical surface).

The rotational movement 324 changes the percentage of the total amount of magnetic flux generated by coil 210 that is received by target 208. Accordingly, the movement also causes changes in the magnitudes of the eddy currents. The percentage of coverage (e.g., of the target 208 relative to the sensing domain area 220) potentially varies from zero percent to 100 percent in various embodiments. As the percentage of coverage increases during rotation (e.g., due to a greater area of the target falling with the sensing domain area 220) of target 308, the percentage of the total amount of magnetic flux generated by coil 210 that is received by target 308 is increased (e.g., in accordance with the increased magnitude of the eddy currents). As the percentage of coverage decreases during rotation (e.g., due to a smaller area of the target falling with the sensing domain area 220), the percentage of the total amount of magnetic flux generated by coil 210 that is received by target 208 (e.g., in accordance with the decrease of the magnitudes of the eddy currents).

The changes of the (e.g., percentage of) magnetic flux received by target 308 (as well as the changes of magnitudes of the eddy currents in the target 208) cause corresponding changes in the nominal (e.g., uninfluenced) electrical characteristics of coil 210 such as the inductance of coil 210 and the quality (e.g., Q-factor) of coil 210. An indication (e.g., signal) of a selected (e.g., inductance and/or quality) characteristic is sent to the position processor 138, which determines a position (and/or orientation) of the target 308 relative to the coil 210 in response to the changes in one or more indications of the selected characteristic.

The induced changes to the applied stimulus to the sensor coil 210 are detected by the LDC 240 and processed (e.g., via z-height register 250 and processor 260) in accordance with the z-height signal output by the z-height sensor 230 to determine a relative position of target 208. The relative position can be described in terms of k(phi), where k(phi) indicates an angular position in time of the target 308 about the axis 312 of rotation.) As described below, the LDC 240 is optionally operable to measure variations in the applied current by measuring a change in resonance of the coil 210 and/or by measuring a change in voltage (including by measuring the attendant changes in current and/or resistance) of the coil 210. The accuracy of the determination of the positioning of the target is enhanced by compensating for measured changes in the height between a point relative to the coil and a point relative to the target. The changes in height are scaled (e.g., corrected and/or compensated for) in accordance with the coupling factor K.

The shape of the target 308 is a ring having a uniquely differing coverage (e.g., in accordance with differing ring widths) over a rotation of zero to PI radians (e.g., where the direction of rotation is known, the degree of rotation of the target 308 is determinable over 2PI radians). The use of a conductive ring (e.g., loop) as target 308 includes parasitic inductive coupling between the coil 210 and the target 308.

Figure 4:
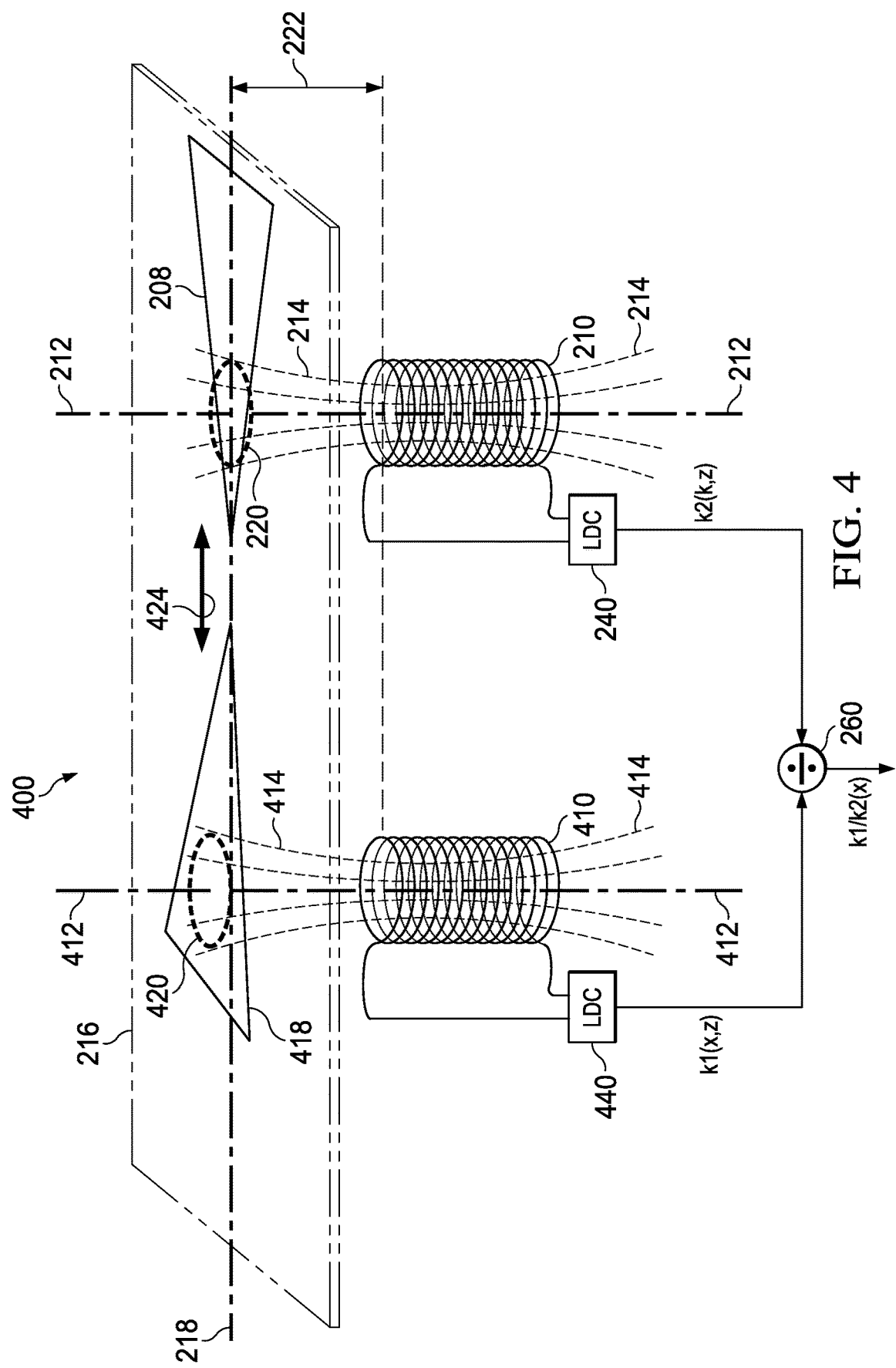
FIG. 4 is a schematic diagram of a ratio-metric linear inductive position detector in accordance with embodiments of the disclosure.

FIG. 4 is a schematic diagram of a ratio-metric linear inductive position detector in accordance with embodiments of the disclosure. Generally described, an inductive position detector 400 is communicatively coupled to the position processor 138 and is operable to detect a position of a conductive objects (e.g., targets 208 and 418), which linearly move in (e.g., or along) a two-dimensional plane 228 (e.g., where the plane is defined relative to a surface of substrate 216). Generally, the orientation of the shapes 218 and 418 are reversed (e.g., shaped) such that the ratio of coverage between magnetic field-domains 220 and 420 (e.g., uniquely) identify a position (e.g., degree of movement) for the targets 218 and 418 as they move in tandem (e.g., a same distance) over a portion of axis 218. In an embodiment, the sum of the coverages of areas magnetic field-domains 220 and 420 is a constant. The field lines 414 are generated in accordance with axis 412 (which is substantially perpendicular to a intersect a surface of substrate 216 in a sensing domain area 420)

The linear movement 224 along axis 218 changes the percentage of the total amount of magnetic flux generated by coil 210 that is received by target 208. Accordingly, the movement also causes changes in the magnitudes of the eddy currents. The percentage of coverage (e.g., of the target 208 relative to the sensing domain area 220) can vary from zero percent to 100 percent. As the percentage of coverage increases during linear movement, the percentage of the total amount of magnetic flux generated by coil 210 that is received by target 208 is increased (e.g., in accordance with the increased magnitude of the eddy currents). As the percentage of coverage decreases during linear movement, the percentage of the total amount of magnetic flux generated by coil 210 that is received by target 208 (e.g., in accordance with the decrease of the magnitudes of the eddy currents).

The linear movement 224 along axis 218 changes the percentage of the total amount of magnetic flux generated by a sensor (e.g., coil 410) that is received by target 418. Accordingly, the movement also causes changes in the magnitudes of the eddy currents. The percentage of coverage (e.g., of the target 418 relative to the sensing domain area 420) can vary from zero percent to 100 percent. As the percentage of coverage increases during linear movement, the percentage of the total amount of magnetic flux generated by coil 410 that is received by target 418 is increased. As the percentage of coverage decreases during linear movement, the percentage of the total amount of magnetic flux generated by coil 410 that is received by target 418.

The changes of the (e.g., percentage of) magnetic flux received by target 208 cause corresponding changes in the nominal electrical characteristics of coil 210 such as the inductance of coil 210 and the quality (e.g., Q-factor) of coil 210. An indication (e.g., signal) of a selected (e.g., inductance and/or quality) characteristic is generated for determining a position (and/or orientation) of the target 208 relative to the coil 210 in response to the changes in one or more indications of the selected characteristic. Likewise, the changes of the (e.g., percentage of) magnetic flux received by target 418 cause corresponding changes in the nominal electrical characteristics of coil 410 such as the inductance of coil 410 and the quality (e.g., Q-factor) of coil 410. An indication (e.g., signal) of a selected (e.g., inductance and/or quality) characteristic is generated for determining a position (and/or orientation) of the target 418 relative to the coil 410 in response to the changes in one or more indications of the selected characteristic.

The induced changes to the applied stimulus to the sensor coil 210 are detected by the LDC 240, which generates a value k2(k,z) (e.g., having an x-y dependency k and a z-dependency z). Likewise, the induced changes to the applied stimulus to the sensor coil 410 are detected by the LDC 440, which generates a value k1(k,z) (e.g., having an x-y dependency k and a z-dependency z). As introduced above, the ratio of coverages identifies (e.g., determines) a position of the targets along a portion of the axis 218. In addition, ideally both k2 and k1 have substantially the same z-dependencies. Processor 260 is operable to divide k2 by k1 (or vice versa) to reduce or substantially eliminate the z-dependency, which renders determining, for example, an exact height superfluous in many applications. The relative position of the targets 208 and 418 can be described in terms of k1/k2(x), where k1/k2(x) indicates a position in time of the target 208 (and/or 418) along a portion of the axis 218. The accuracy of the determination of the positioning of the target is enhanced by virtually eliminating dependencies upon the height between a point relative to the coil and a point relative to a target.

Figure 5:
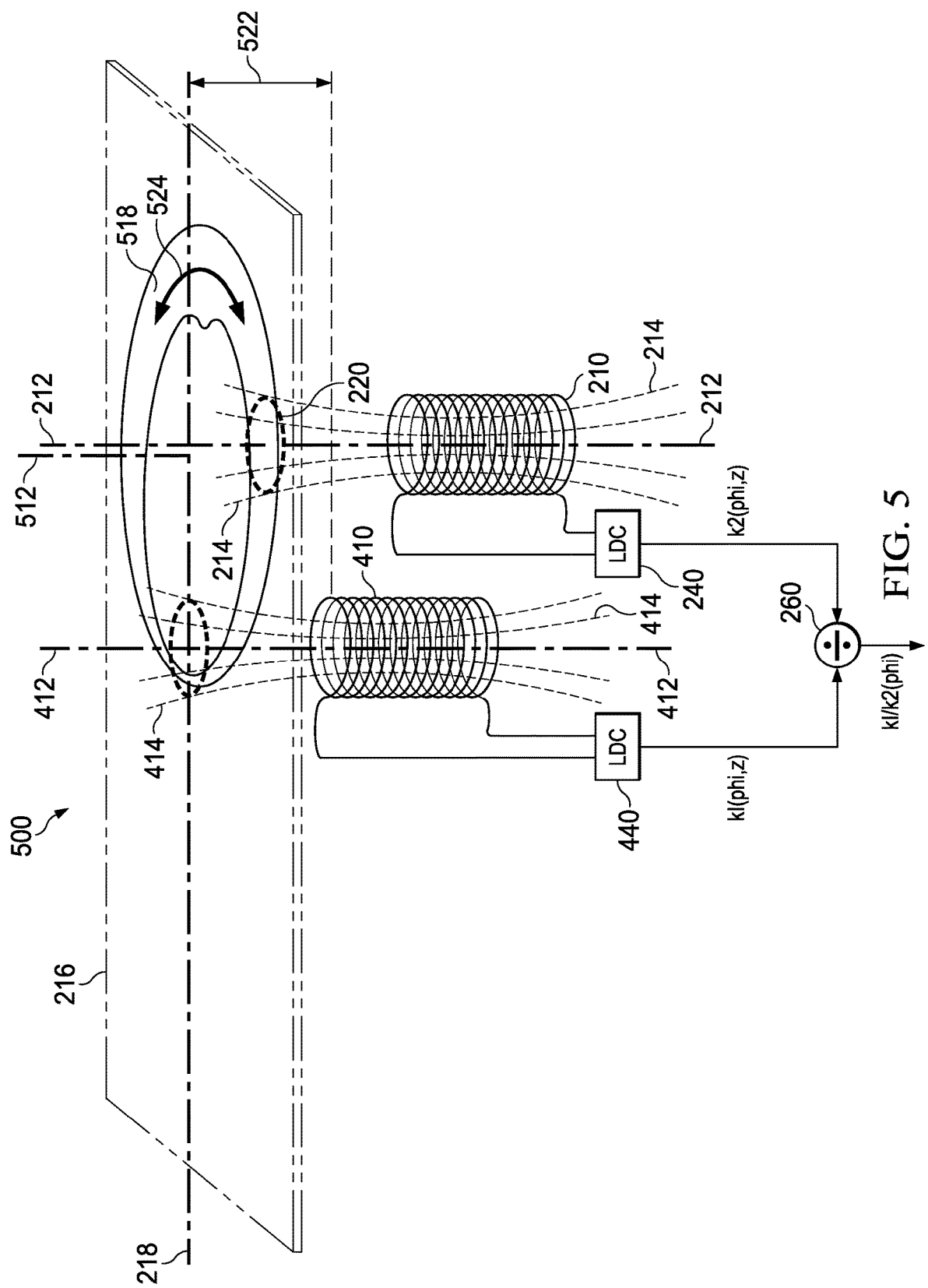
FIG. 5 is a schematic diagram of a ratio-metric angular inductive position detector in accordance with embodiments of the disclosure.

FIG. 5 is a schematic diagram of a ratio-metric angular inductive position detector in accordance with embodiments of the disclosure. Generally described, an inductive position detector 500 is communicatively coupled to the position processor 138 and is operable to detect of position of a conductive object (e.g., target 518), which rotates in (e.g., or along) a two-dimensional plane 228 about axis 512. Generally, the angular deviation of axis 212 of coil 210 from the axis 412 of coil 410 is displaced by PI/2 radians around axis 512 such that a degree of rotation of target 518 about can be determined over PI radians about axis 512 (and when the direction of rotation is known, the degree of rotation of target 518 about can be determined over 2PI radians).

The rotational movement 524 changes the percentage of the total amount of magnetic flux generated by coil 210 that is received by target 518 as well as changes the percentage of the total amount of magnetic flux generated by coil 410 that is received by target 518. The changes of the (e.g., percentage of) magnetic flux received by target 518 cause corresponding changes in the nominal electrical characteristics of coil 210 such as the inductance of coil 210 and the quality (e.g., Q-factor) of coil 210. Likewise, the changes of the (e.g., percentage of) magnetic flux received by target 518 cause corresponding changes in the nominal electrical characteristics of coil 410 such as the inductance of coil 410 and the quality (e.g., Q-factor) of coil 410. An indication (e.g., signal) of a selected (e.g., inductance and/or quality) characteristic is generated for determining an orientation of the target 518 about axis 512 in response to the changes in one or more indications of the selected characteristic.

The induced changes to the applied stimulus to the sensor coil 210 are detected by the LDC 240, which generates a value k2(phi,z) (e.g., having an x-y dependency phi and a z-dependency z). Likewise, the induced changes to the applied stimulus to the sensor coil 410 are detected by the LDC 440, which generates a value k1(phi,z) (e.g., having an x-y dependency phi and a z-dependency z). As discussed above, the ratio of coverages identifies (e.g., determines) a (e.g., degree of) rotation for the target 518 about the axis 512. In addition, ideally both k2 and k1 have substantially the same z-dependencies. Processor 260 is operable to divide k2 by k1 (or vice versa) example, to reduce or substantially eliminate the z-dependency, for example, which renders determining an exact height superfluous in many applications. The angular position of the target 518 can be described in terms of k1/k2(phi), where k1/k2(phi) indicates a degree of rotation in time of the target 518 about the axis 512. The accuracy of the determination of the positioning of the target is enhanced by virtually eliminating dependencies upon the height between a point relative to the coil and a point relative to a target.

Figure 6:
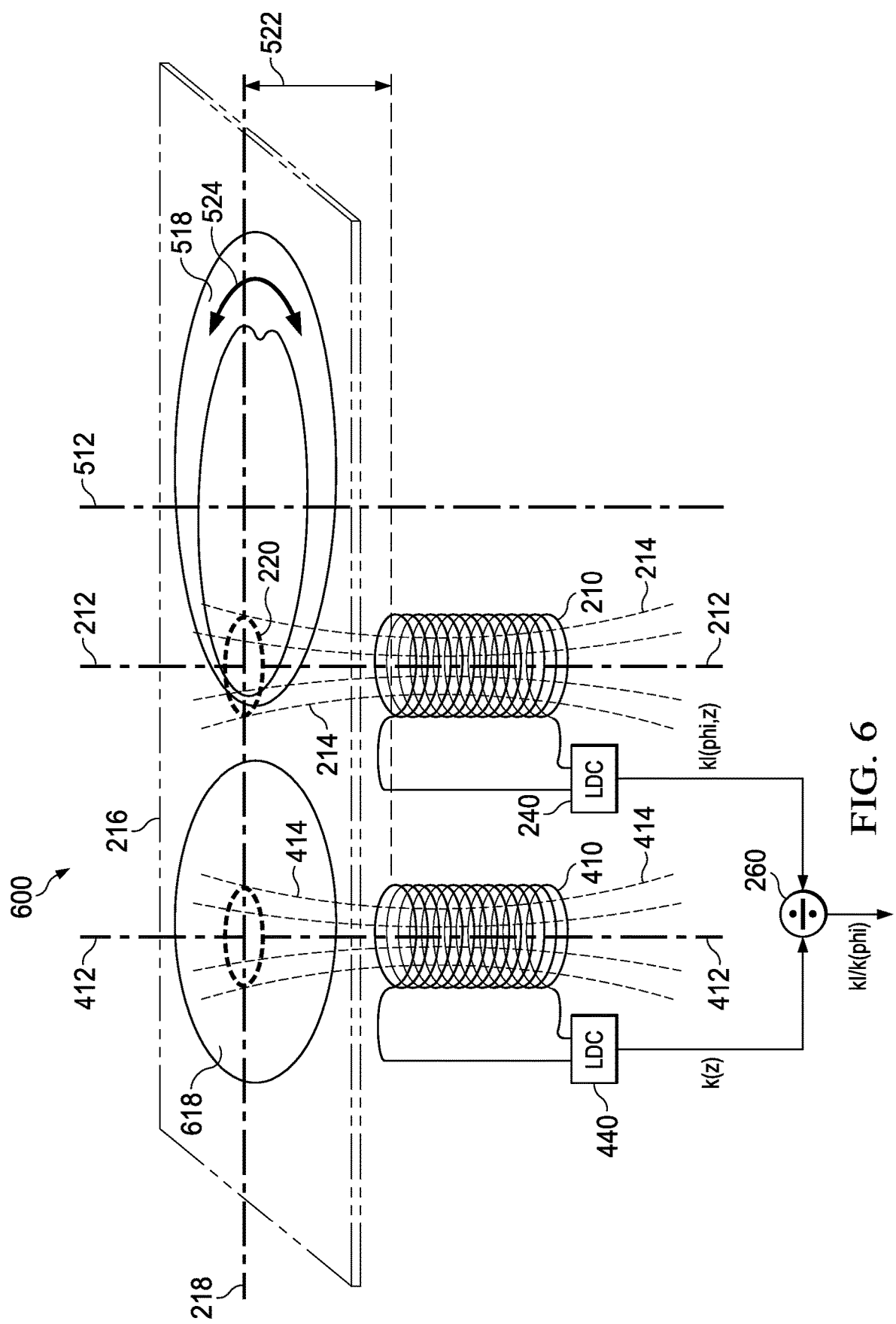
FIG. 6 is a schematic diagram of an inductive-ratio angular position detector in accordance with embodiments of the disclosure.

FIG. 6 is a schematic diagram of an inductive-ratio angular position detector in accordance with embodiments of the disclosure. Generally described, an inductive-ratio position detector 600 is communicatively coupled to the position processor 138 and is operable to detect of position of a conductive object (e.g., target 518), which rotates in (e.g., or along) a two-dimensional plane 228 about axis 512. Generally, target 618 is a conductive reference target that remains stationary relative to substrate 216.

The rotational movement 524 changes the percentage of the total amount of magnetic flux generated by coil 210 that is received by target 518. However, except for changes in height (e.g., relative distance 222), the change the percentage of the total amount of magnetic flux generated by coil 410 that is received by target 618 remains substantially constant.

The changes of the (e.g., percentage of) magnetic flux received by target 518 cause corresponding changes in the nominal electrical characteristics of coil 210 such as the inductance of coil 210 and the quality (e.g., Q-factor) of coil 210. An indication (e.g., signal) of a selected (e.g., inductance and/or quality) characteristic is generated for determining a position (and/or orientation) of the target 518 about axis 512 in response to the changes in one or more indications of the selected characteristic.

The induced changes to the applied stimulus to the sensor coil 210 are detected by the LDC 240, which generates a value k1(phi,z) (e.g., having an x-y dependency phi and a z-dependency z). Likewise, the induced changes to the applied stimulus to the sensor coil 410 are detected by the LDC 440, which generates a value k(phi,z) (e.g., having substantially no x-y dependency phi and having a z-dependency z). As discussed above, the ratio of coverages identifies (e.g., determines) a (e.g., degree of) rotation for the target 518 about the axis 512. In addition, ideally both k2 and k have substantially the same z-dependencies. Processor 260 is operable to divide k2 by k1 (or vice versa), for example, to reduce or substantially eliminate the z-dependency, which renders determining, for example, an exact height superfluous in many applications. The angular position of the target 518 can be described in terms of k1/k(phi), where k1/k(phi) indicates a degree of rotation in time of the target 518 about the axis 512.

The accuracy of the determination of the positioning of the target is enhanced by virtually eliminating dependencies upon the height between a point relative to the coil and a point relative to a target. Accordingly, the term k(phi) is operable as a fixed reference to obtain the vertical component of the coupling factor K to determine a position of the target (e.g., target 208) discussed above with reference to FIG. 2 and FIG. 3.

Figure 7:
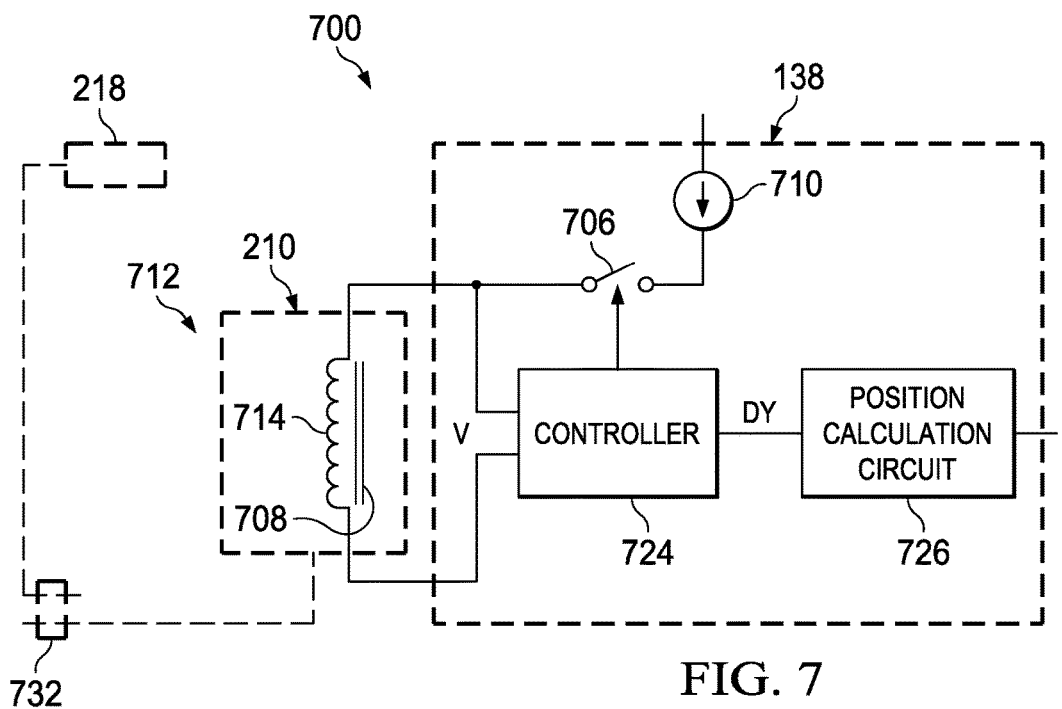
FIG. 7 is a schematic diagram illustrating inductance coil characteristic measurement by an inductive position detector in accordance with embodiments of the disclosure.

FIG. 7 is a schematic diagram illustrating inductance coil characteristic measurement by an inductive position detector in accordance with embodiments of the disclosure. Position detecting system 700 is a system such as inductive position detector 200. Position detecting system 700 includes a sensor 210 that has an inductor 712. In the present example, the inductor 712 is implemented as coil 714. Coil 714 has a spiral shape, although other coil shapes, such as a planar shape, can simultaneously or alternately be used. In addition, coil 714 has a longitudinal axis X, such as axis 212. The longitudinal axis of a coil is a notional line that passes through both the magnetic north and south poles of the magnetic field that is generated by the coil when the coil is excited by a DC electric current.

As shown in FIG. 7, sensor 210 is implemented with a single coil 714 (optionally including a magnetic core 708), while position processor 138 is implemented with a current source 710 that sources a DC current into coil 714, and a switch 706 that is coupled to coil 714 and current source 710.

The position processor 138 is also implemented with a controller 724, which controls the open and closed state of switch 706, and which measures a voltage V across coil 714. The position processor 138 is further implemented with a position calculation circuit 726 that determines a position of target 208 with respect to the position of sensor 210 in response to a decay signal DY output by controller 724.

The position detecting system 100 additionally includes a support structure 732 that is connected to sensor 210 and target 208. The support structure 732 can include a single structure or any combination of structures or elements that allow sensor 210 and target 208 to move relative to each other.

For example, the support structure 732 can hold the sensor 210 in a fixed position and allow target 208 to move within plane 228. Alternately, support structure 732 can hold target 208 in a fixed position and allow sensor 210 to move in a plane that lies parallel to plane 228. Further, the support structure 732 can allow both the sensor 210 and the target 208 to move at various times, for example, in unison and/or independently of each other.

In operation, controller 314 closes switch 706 for a predetermined period of time, which allows current source 310 to source a current into coil 714. The current sourced into coil 714 generates a time varying magnetic field. Next, controller 314 opens switch 706, and then detects the decay of the voltage V across coil 714.

The magnetic field induces eddy currents to flow in target 208. The eddy currents weaken the magnetic field which, in turn, changes the rate that the voltage V decays across coil 714. Controller 314 measures the changes in the decay rates, and outputs the decay signal DY to represent the change in the decay rates. Position calculation circuit 316 then determines a position of target 208 with respect to the position of sensor 210 in response to the decay signal DY by using (or eliminating) a height dependency factor determined from sensor 230 as discussed above.

Figure 8:
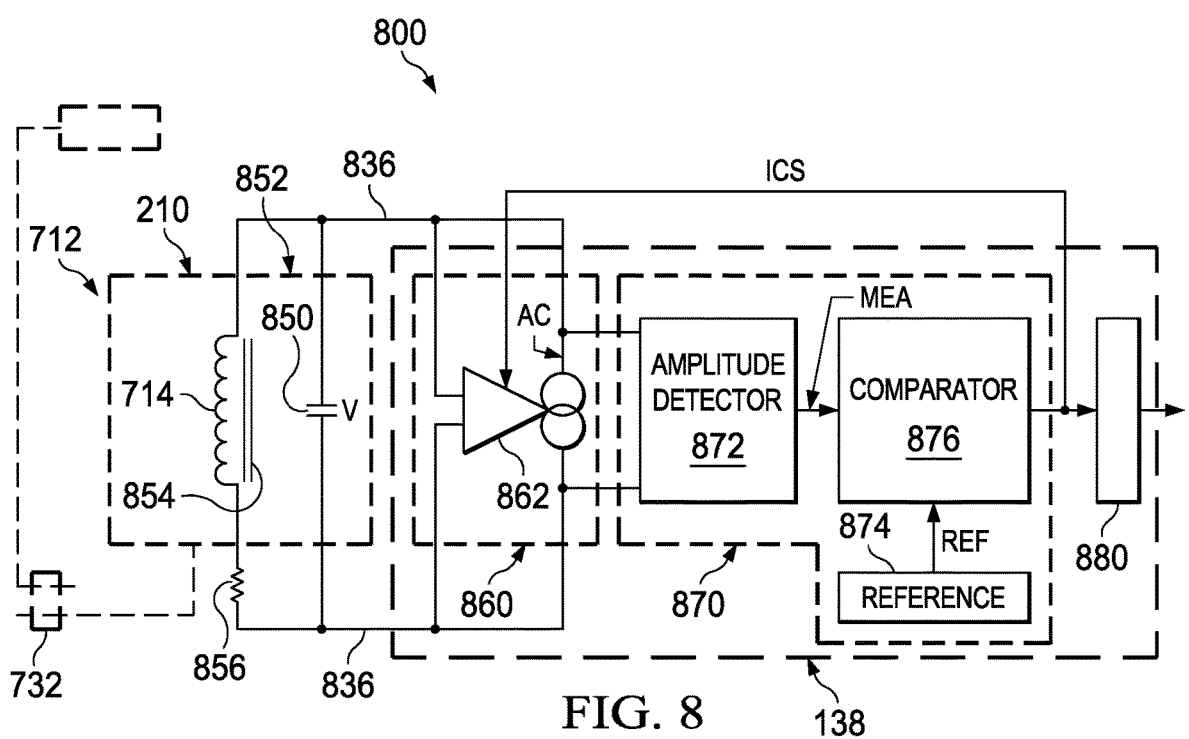
FIG. 8 is a schematic diagram illustrating Q-factor coil characteristic measurement by an inductive position detector in accordance with embodiments of the disclosure.

FIG. 8 is a schematic diagram illustrating Q-factor coil characteristic measurement by an inductive position detector in accordance with embodiments of the disclosure. Position detecting system 800 is a system such as inductive position detector 200. As shown, the sensor 210 is inductively coupled to coil 714, which in turn is electrically connected to the capacitor 850 to form a tank circuit 852. Although the FIG. 8 example illustrates the coil 714 and capacitor 850 connected in parallel, coil 714 and capacitor 850 can alternately be connected in series. In addition, the coil 714 can optionally be wrapped around a magnetic core 354 to increase the strength of the time varying magnetic field. Further, tank circuit 852 includes wiring that provides the connections between coil 714 and capacitor 850. In FIG. 8, the resistances of coil 714 and the wiring is represented as resistor 856. Coil 714, capacitor 850, and the wiring have a combined impedance Z in response to an alternating signal.

The position processor 138 is implemented with a negative impedance circuit 860 that is connected to the tank circuit 852. The negative impedance circuit 860 compensates exactly for the positive resonance impedance of tank circuit 852 to enable steady state oscillation. The negative impedance circuit 860 can be implemented in a number of different ways that are well known to those skilled in the art. In the present example, negative impedance circuit 860 is implemented as including a transconductance amplifier 862, configured as a negative impedance device.

As additionally shown in FIG. 8, the position processor 138 is also implemented with an amplitude control circuit 870 for detecting a change in the amplitude of an alternating (e.g., current) signal V, and outputs an impedance control signal ICS to the negative impedance circuit 860 in response to the change. A wiring assembly 836 electrically couples the position processor 138 to the amplitude control circuit 870. The impedance control signal ICS provides an indication of changes to the amount of power that is supplied to tank circuit 852 such that the time varying magnetic field can continue to oscillate at a substantially constant amplitude.

In the present example, the amplitude control circuit 870 includes an amplitude detector 872 that measures the amplitude of the alternating voltage V across tank circuit 852, and outputs a measured amplitude signal MEA in response. The amplitude control circuit 870 also includes a reference circuit 874 for generating a reference signal REF that corresponds to the oscillation amplitude of alternating voltage V.

The amplitude control circuit 870 additionally includes a comparator output circuit 876 for comparing the measured amplitude signal MEA to the reference amplitude signal REF, and in response to the comparison, to generate the impedance control signal ICS (e.g., where the comparison is based on the difference between the measured amplitude signal MEA and the reference amplitude signal REF).

The position processor 138 is further implemented as including a translator 880 that is connected to receive the impedance control signal ICS output from comparator output circuit 876. The translator 880, which can include a look-up table, outputs a position of target 208 in response to the impedance control signal ICS and by using (or eliminating) a height dependency factor determined from sensor 230 as discussed above.

In operation of the position detecting system 800, electrical energy flows back and forth between coil 714 and capacitor 850 in tank circuit 852, oscillating at a frequency that is defined by the values of the coil 714 and capacitor 850. The amplitude of the oscillation is kept constant by the negative impedance circuit 860, which actively compensates for the positive impedance of tank circuit 852.

For example, an ideal tank circuit oscillating at the resonant frequency is theoretically lossless, by alternately storing the energy between the inductor and the capacitor. However, real-world tank circuits are not lossless, but continuously radiate small amounts of energy due to the resistance 856 associated with the coil 714, impedance of the capacitor 850, the resistance of the wires that connect the coil 714 to the capacitor 850, and the eddy current resistive losses that the magnetic field generated by coil 714 induces in target 208.

Accordingly, the negative impedance circuit 860 provides relatively small amounts of additional maintenance energy to tank circuit 852. The small amount of additional maintenance energy allows tank circuit 852 to overcome the energy losses due to the losses in both tank circuit 852 and in target 208, which allows tank circuit 852 to maintain a substantially steady oscillation.

In the present example, the amplitude detector 872 generates the measured amplitude signal MEA to indicate changes in the amplitude of the time varying magnetic field. The measured amplitude signal MEA is generated by measuring changes in the amplitude of the alternating voltage V across (e.g., opposing terminals of) tank circuit 852. The comparator output circuit 374 receives the measured amplitude signal MEA, compares the measured amplitude signal MEA against the reference amplitude signal REF from reference circuit 876, and outputs the impedance control signal ICS in response to the difference between the measured amplitude signal MEA and the reference amplitude signal REF. The impedance circuit 860 responds to the impedance control signal ICS by adjusting the negative impedance in order to match and compensate for the positive impedance of tank circuit 852 to maintain the oscillation amplitude at a level that is substantially equal to the amplitude reference REF generated by comparator output circuit 374.

Accordingly, after the tank circuit 852 begins to oscillate at the resonant frequency, the negative impedance circuit 860 provides the maintenance energy otherwise consumed by tank circuit 852, which compensates for the positive impedance of tank circuit 852 and helps maintain an oscillation amplitude of sensor 210 at the amplitude reference REF provided by reference circuit 374.

When target 208 lies within the sensing domain area 220 of the time varying magnetic field generated by tank circuit 852, the time varying magnetic field induces eddy currents to flow in target 208. The eddy currents effectively have the same effect as a resistor placed across tank circuit 852, and accordingly change the amplitude of the time varying magnetic field.

As a result, the positive impedance of tank circuit 852 decreases, such that the amplitude of the alternating voltage V across tank circuit 852 decreases. Amplitude detector 872 measures the changes in the amplitude of the time varying magnetic field by measuring changes in the amplitude of the alternating voltage V, and generates the measured amplitude signal MEA in response.

The comparator output circuit 876 receives the measured amplitude signal MEA, compares the measured amplitude signal MEA to the reference amplitude signal REF, and outputs the impedance control signal ICS in response to the difference between the measured amplitude signal MEA and the reference amplitude signal REF. The negative impedance circuit 860 responds to the impedance control signal ICS by decreasing the magnitude of the negative impedance in order to match the relatively lower positive impedance of tank circuit 852 such that a steady state oscillation of tank circuit 852 is maintained at an oscillation amplitude where the alternating voltage V substantially corresponds to (e.g., substantially equals) the reference amplitude signal REF indicated by the reference circuit 374.

The amplitude control circuit 870 detects the falling amplitude (e.g., caused by the target 208 lying or moving within the sensing domain area 220 of the time varying magnetic field generated by tank circuit 852) and outputs the impedance control signal ICS. In response to the impedance control signal ICS, the negative impedance circuit 860 decreases the magnitude of its negative impedance to compensate for reductions of the positive resonance impedance of tank circuit 852 resulting from the presence of target 208 in the time varying magnetic field.

Accordingly, the position detecting system 800 is an example functional embodiment of a resonant sensor system operable to establish at the output of a resonant sensor a negative impedance controller for maintaining a substantially constant sensor output resonant amplitude. The output signal of the comparator output circuit 876 is "fed back" to control the gain of transconductance amplifier transconductance amplifier 862, which establishes a sensor control loop in which the controlled negative impedance corresponds to the response of the sensor to the target according to aspects of the disclosure herein.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A system, comprising:
    a sensing area including a surface orthogonal to a longitudinal axis;
    a first sensor having a coil around the longitudinal axis, the coil configured to generate a time-varying magnetic field responsive to an electrical stimulus, the time-varying magnetic field having magnetic field lines intersecting the sensing area, and the coil having an inductance that changes as a conductive target moves within the sensing area relative to the coil;
    a second sensor having a first output and configured to:
        measure a distance along the longitudinal axis between the coil and the surface; and
        provide a first value at the first output indicative of the measured distance;
    an inductance-to-digital converter having a stimulus output and a second output, and configured to:
        apply the electrical stimulus to the coil via the stimulus output;
        measure the inductance by measuring a change in resonance of the coil; and
        provide a second value at the second output indicative of the measured inductance; and
    circuitry having first and second inputs, the first input coupled to the first output, the second input coupled to the second output, and the circuitry configured to:
        responsive to the first value, determine a longitudinal component of a coupling factor between the coil and the target along the longitudinal axis, the coupling factor indicative of a difference between the inductance of the coil and a nominal inductance of the coil;
        responsive to the longitudinal component, scale the second value to compensate for a dependency between the inductance and the distance along the longitudinal axis; and
        determine a position of the target within the sensing area responsive to the scaled second value.

2. The system of claim 1, wherein: the target receives an amount of magnetic flux from the time-varying magnetic field; the amount of magnetic flux received by the target changes as the target moves within the sensing area relative to the coil; and the inductance changes responsive to a change in the amount of magnetic flux received by the target.

3. The system of claim 1, wherein the coil has a quality factor.

4. The system of claim 1, wherein the target is shaped to variably cover the sensing area according to a movement of the target within the sensing area.

5. The system of claim 4, wherein the movement of the target within the sensing area includes a translation of the target relative to the sensing area.

6. The system of claim 4, wherein the movement of the target within the sensing area includes a rotation of the target relative to the sensing area.

7. The system of claim 1, wherein the circuitry includes a processing circuit.

8. The system of claim 1, wherein the target is a first target, the sensing area is a first sensing area, and the second sensor is configured to generate a reference inductance responsive to a second target moving within a second sensing area, and the second target is movable in tandem with the first target.

9. The system of claim 1, wherein the target is a first target, the sensing area is a first sensing area, and the second sensor is configured to generate a reference inductance responsive to a second target moving within a second sensing area, and the second target is movable independently of the first target.

* * * * *